(12) United States Patent
Shin et al.

(10) Patent No.: US 8,268,198 B2
(45) Date of Patent: Sep. 18, 2012

(54) PRECURSOR FOR PREPARATION OF LITHIUM TRANSITION METAL OXIDE

(75) Inventors: Ho Suk Shin, Seoul (KR); Sung kyun Chang, Daejeon (KR); Hong-Kyu Park, Daejeong (KR); Sinyoung Park, Daejeon (KR); Youngsun Choi, Daejeon (KR); Seung Tae Hong, Daejeon (KR); Hyo-shik Kil, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/679,210

(22) PCT Filed: Apr. 3, 2009

(86) PCT No.: PCT/KR2009/001735
§ 371 (c)(1),
(2), (4) Date: Jan. 3, 2011

(87) PCT Pub. No.: WO2009/145494
PCT Pub. Date: Dec. 3, 2009

(65) Prior Publication Data
US 2011/0089367 A1     Apr. 21, 2011

(30) Foreign Application Priority Data

Apr. 3, 2008  (KR) .................. 10-2008-0031081

(51) Int. Cl.
| | |
|---|---|
| *H01B 1/02* | (2006.01) |
| *H01B 1/10* | (2006.01) |
| *H01B 1/08* | (2006.01) |
| *H01M 4/13* | (2010.01) |
| *H01M 4/58* | (2010.01) |

(52) U.S. Cl. ............. 252/521.2; 252/519.1; 252/519.12; 252/519.14; 252/519.15; 252/182.1; 252/182.33; 429/231.1; 429/231.3; 427/126.1; 427/126.3; 427/126.6

(58) Field of Classification Search .............. 252/519.1, 252/519.14, 519.12, 519.15, 521.2, 182.33, 252/182.1; 429/231.1, 231.3, 231.95, 223, 429/224; 427/126.1, 126.3, 126.6
See application file for complete search history.

(56) References Cited

U.S. PATENT DOCUMENTS

| | | | |
|---|---|---|---|
| 2005/0037263 A1 | 2/2005 | Wang et al. | |
| 2005/0220700 A1* | 10/2005 | Suhara et al. | 423/594.4 |
| 2006/0068289 A1 | 3/2006 | Paulsen et al. | |
| 2006/0194114 A1* | 8/2006 | Saito | 429/232 |
| 2006/0204849 A1* | 9/2006 | Saito et al. | 429/231.1 |
| 2006/0204851 A1* | 9/2006 | Lee et al. | 429/231.3 |
| 2007/0015058 A1* | 1/2007 | Takezawa et al. | 429/231.95 |
| 2007/0190419 A1* | 8/2007 | Takezawa | 429/231.1 |
| 2008/0083989 A1* | 4/2008 | Aoi et al. | 257/751 |
| 2008/0160410 A1* | 7/2008 | Sun et al. | 429/220 |
| 2008/0160412 A1* | 7/2008 | Kasamatsu et al. | 429/223 |
| 2008/0280205 A1* | 11/2008 | Jiang et al. | 429/223 |
| 2009/0117469 A1* | 5/2009 | Hiratsuka et al. | 429/231.8 |
| 2009/0194734 A1* | 8/2009 | Arimoto | 252/182.1 |

FOREIGN PATENT DOCUMENTS

| | | |
|---|---|---|
| CN | 1964103 A | 5/2007 |
| JP | 2000-21402 A | 1/2000 |
| JP | 2005-327644 A | 11/2005 |
| KR | 10-2006-0051055 A | 5/2006 |

* cited by examiner

*Primary Examiner* — Joseph D Anthony
(74) *Attorney, Agent, or Firm* — Birch, Steward, Kolasch & Birch, LLP

(57) ABSTRACT

Provided is a precursor for the preparation of a lithium transition metal oxide that is used for the preparation of a lithium transition metal oxide as a cathode active material for a lithium secondary battery, through a reaction with a lithium-containing compound, wherein the precursor contains two or more transition metals, and sulfate ion ($SO_4$)-containing salt ions derived from a transition metal salt for the preparation of the precursor have a content of 0.1 to 0.7% by weight, based on the total weight of the precursor.

10 Claims, No Drawings

PRECURSOR FOR PREPARATION OF LITHIUM TRANSITION METAL OXIDE

FIELD OF THE INVENTION

The present invention relates to a precursor for the preparation of a lithium transition metal oxide. More specifically, the present invention relates to a precursor for the preparation of a lithium transition metal oxide that is used for the preparation of a lithium transition metal oxide as a cathode active material for a lithium secondary battery, through a reaction with a lithium-containing compound, wherein the precursor contains two or more transition metals, and the precursor also contains sulfate ion ($SO_4$)-containing salt ions derived from a transition metal salt for the preparation of the precursor at a content of 0.1 to 0.7% by weight based on the total weight of the precursor.

BACKGROUND OF THE INVENTION

Technological development and increased demand for mobile equipment have led to a rapid increase in the demand for secondary batteries as an energy source. Among other things, lithium secondary batteries having a high-energy density and voltage, a long cycle lifespan and a low self-discharge rate are commercially available and widely used.

As a cathode active material for the lithium secondary battery, lithium-containing cobalt oxide ($LiCoO_2$) is largely used. In addition, consideration has also been made of using lithium-containing manganese oxides such as $LiMnO_2$ having a layered crystal structure and $LiMn_2O_4$ having a spinel crystal structure, and lithium-containing nickel oxides ($LiNiO_2$).

Of the aforementioned cathode active materials, $LiCoO_2$ is currently widely used due to superior general properties such as excellent cycle characteristics, but suffers from disadvantageous problems such as low safety, expensiveness due to finite resources of cobalt as a raw material, and the like. Lithium manganese oxides such as $LiMnO_2$ and $LiMn_2O_4$ are abundant resource materials and advantageously employ environmentally-friendly manganese, and therefore have attracted a great deal of attention as a cathode active material capable of substituting $LiCoO_2$. However, these lithium manganese oxides suffer from shortcomings such as a low capacity and poor cycle characteristics.

Whereas, lithium/nickel-based oxides such as $LiNiO_2$ are inexpensive as compared to the cobalt-based oxides and exhibit a high discharge capacity upon charging to 4.25 V. The reversible capacity of doped $LiNiO_2$ approximates about 200 mAh/g which exceeds the capacity of $LiCoO_2$ (about 153 mAh/g). Therefore, despite somewhat lower average discharge voltage and volumetric density of $LiNiO_2$, commercial batteries containing $LiNiO_2$ as a cathode active material exhibit an improved energy density. To this end, a great deal of intensive research is being actively undertaken on the feasibility of applications of such nickel-based cathode active materials for the development of high-capacity batteries.

Many prior arts focus on improving properties of $LiNiO_2$-based cathode active materials and manufacturing processes of $LiNiO_2$. For example, a lithium transition metal oxide has been proposed wherein a portion of nickel is substituted with another transition metal element such as Co, Mn, etc. However, the $LiNiO_2$-based cathode active materials still suffer from some weakness which have not been sufficiently solved, such as high production costs, swelling due to gas evolution in the fabricated batteries, poor chemical stability, high pH and the like.

Meanwhile, a lithium transition metal oxide is generally prepared by mixing a lithium precursor and a transition metal precursor and sintering the mixture at a high temperature. As the transition metal precursor, a transition metal oxide or a transition metal hydroxide is largely employed. In addition, when two or more transition metals are contained, individual transition metal materials are added, or otherwise they are used in the form of composite transition metal oxide or composite transition metal hydroxide.

In order to prepare lithium transition metal oxides having excellent discharge capacity, life characteristics and rate characteristics when it is used as a cathode active material, during a manufacturing process of this type of transition metal precursor, research of the conventional art has been focused on the prevention of tap density lowering by control of the particle size or the optimization of particle shape by spheronization or the like.

In spite of various attempts which have been made as above, there is still a strong need in the art for the development of a lithium transition metal oxide having satisfactory performance and a transition metal precursor for preparing the same.

SUMMARY OF THE INVENTION

Therefore, the present invention has been made to solve the above problems and other technical problems that have yet to be solved.

As a result of a variety of extensive and intensive studies and experiments to solve the problems as described above, the inventors of the present invention have discovered that when a precursor contains a certain amount of salt ions derived from a transition metal salt which serves as a raw material of the precursor, a secondary battery based on the lithium transition metal oxide prepared from such a precursor can exhibit excellent performance and minimized degradation of electrodes. The present invention has been completed based on these findings.

DETAILED DESCRIPTION OF PREFERRED EMBODIMENTS

Therefore, the present invention provides a precursor for the preparation of a lithium transition metal oxide that is used for the preparation of a lithium transition metal oxide as a cathode active material for a lithium secondary battery, through a reaction with a lithium-containing compound, wherein the precursor contains two or more transition metals, and the precursor also contains sulfate ion ($SO_4$)-containing salt ions derived from a transition metal salt for the preparation of the precursor at a content of 0.1 to 0.7% by weight based on the total weight of the precursor.

Of the precursors for the preparation of a lithium transition metal oxide, the precursor containing two or more transition metals ("transition metal precursor") is prepared using a transition metal salt as a raw material, by a sol-gel, hydrothermal, spray pyrolysis, co-precipitation method or the like.

According to the present invention, the precursor contains a certain amount of salt ions derived from such a transition metal salt, and the salt ions contain sulfate ions ($SO_4$). In this connection, the inventors of the present invention have newly discovered that when the lithium transition metal oxide is prepared using the precursor containing a certain amount of the salt ions, performance of a lithium secondary battery is excellent and degradation of electrodes is significantly inhibited. For example, the lithium transition metal oxide prepared from the precursor in accordance with the present invention shows significantly less production of reaction by-products such as $Li_2CO_3$ or $LiOH \cdot H_2O$, which consequently can provide a solution to problems such as gelation of slurry, deterioration in high-temperature performance of the fabricated battery, swelling at high temperatures, etc., due to undesirable by-products.

It is unclear how the incorporation of sulfate ion-containing salt ions into the precursor exerts the above-mentioned properties. It is just believed that, within the range which is not limitative to the scope of right of the present invention, the salt ions serve as a reaction assistant during a manufacturing process of the lithium transition metal oxide, thereby improving the reactivity and allowing for the preparation of a lithium transition metal oxide having excellent properties.

In the precursor of the present invention, the transition metal may be two or more elements selected from Group VB to VIIIB elements of the Periodic Table of the Elements.

Preferably, the transition metal may be two or more elements selected from the group consisting of Ni, Mn and Co. According to such a configuration, combined properties of the transition metals can be expressed in the lithium-transition metal composite oxide.

Particularly preferably, the transition metal may have a composition of $Ni_xCo_yMn_{1-(x+y)}$ wherein $0.3 \leq x \leq 0.9$, $0.1 \leq y \leq 0.6$, and $x+y \leq 1$. The composition of such a composite transition metal has a high content of Ni, and therefore can be preferably used particularly for the preparation of a cathode active material for a high-capacity lithium secondary battery. Where appropriate, the transition metal may be substituted with one or more elements selected from the group consisting of Al, Mg, Cr, Ti and Si within the range of 0.1 mole or less.

The transition metal salt from which the salt ions are derived may be sulfate. Examples of the sulfate may include nickel sulfate, cobalt sulfate and manganese sulfate. These materials may be used alone or in any combination thereof.

Where appropriate, the salt ions may further include nitrate ions ($NO_3$). The nitrate ions may be derived from nickel nitrate, cobalt nitrate, or manganese nitrate as a transition metal salt.

As illustrated before, the salt ions have a content of 0.1 to 0.7% by weight, based on the total weight of the precursor. Where a content of the salt ions is excessively low, it is difficult to obtain desired effects. Where a content of the salt ions is excessively high, the reactivity thereof is inhibited, which may result in performance deterioration of the fabricated battery using the lithium transition metal oxide. This fact can also be confirmed from the experimental results which will follow. More preferably, a content of the salt ions may be in the range of 0.2 to 0.6% by weight.

The content of salt ions in the precursor may be measured by various methods known in the art. Preferably, a detection method by ion chromatograph which will be defied below may be used.

Therefore, the present invention also provides a precursor for the preparation of a lithium transition metal oxide, wherein 0.1 to 0.7% by weight of sulfate ions ($SO_4$) is detected based on the total weight of the precursor, upon chromatographic measurement of a detection solution which was prepared by adding an acid to dissolve the precursor and diluting the precursor solution with water.

Such a precursor contains substantially only sulfate ions as salt ions and has the above content range of the sulfate ions established by the above-defined specific detection method.

Hereinafter, the preparation of the precursor in accordance with the present invention will be briefly described by way of co-precipitation.

The co-precipitation method is a method involving simultaneous precipitation of two or more elements in an aqueous solution, using a precipitation reaction. In a specific example, a transition metal precursor containing two or more transition metals can be prepared by mixing transition metal salts in a desired molar ratio depending on the kinds of the transition metals, thereby preparing an aqueous solution, and adding a basic material and if desired, a neutralizing agent to the aqueous solution, followed by co-precipitation of a desired product while maintaining a pH of the solution in a basic range.

The transition metal salt, as described above, may be sulfate or the like. Examples of the basic material may include, but are not limited to, sodium hydroxide, potassium hydroxide, and lithium hydroxide. Preferred is sodium hydroxide.

In one preferred embodiment, it is possible to further add an additive and/or alkali carbonate during the co-precipitation process. There is no particular limit to the kinds of the additive. Preferred is one capable of forming a complex with a transition metal. Examples of the additive that can be used in the present invention may include ammonium ion sources, ethylene diamine compounds, citric acid compounds, and the like. Examples of the ammonium ion source may include aqueous ammonia, ammonium sulfate aqueous solution, ammonium nitrate aqueous solution, and so on. The alkali carbonate may be selected from the group consisting of ammonium carbonate, sodium carbonate, potassium carbonate and lithium carbonate. These materials may be used alone or in any combination thereof.

By appropriate control of temperature, pH, reaction time, concentration of slurry, ion concentration and the like during the co-precipitation process, it is possible to control content ratios of components and contents of salt ions as well as an average particle diameter, a particle diameter distribution, and a particle density. For example, a pH for the co-precipitation reaction may be in the range of 9 to 13, and preferably 10 to 12. Control details for the reaction conditions in the co-precipitation method are known in the art, and detailed description thereof will be omitted herein.

Further, the present invention provides a lithium transition metal oxide which is prepared by sintering the precursor for the preparation of a lithium transition metal oxide and the lithium-containing material.

According to the confirmation by the inventors of the present invention, the lithium transition metal oxide prepared using the aforesaid precursor exhibited a very low content of lithium by-products such as lithium carbonate ($Li_2CO_3$) or lithium hydroxide (LiOH). When this lithium transition metal oxide is used as a cathode active material of the lithium secondary battery, there are provided various advantages including superior high temperature stability (such as excellent sintering and storage stability due to a low content of lithium by-products, and reduction of gas evolution), high capacity, and superior cycle characteristics.

There is no particular limit to the lithium-containing material, which may include, for example, lithium hydroxide, lithium carbonate, and lithium oxide. Preferred is lithium carbonate ($Li_2CO_3$) and/or lithium hydroxide (LiOH).

Examples of the lithium transition metal oxides that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$, and $LiMnO_2$; lithium copper oxide ($Li_2CuO_2$); vanadium oxides such as $LiV_3O_8$; Ni-site type lithium nickel oxides of Formula $LiNi_{1-x}M_xO_2$ (M=Co, Mn, Al, Cu, Fe, Mg, B, or Ga, and $0.01 \leq x \leq 0.3$); lithium manganese composite oxides of Formula $LiMn_{2-x}M_xO_2$ (M=Co, Ni, Fe, Cr, Zn, or Ta, and $0.01 \leq x \leq 0.1$), or Formula $Li_2Mn_3MO_8$ (M=Fe, Co, Ni, Cu, or Zn); $LiMn_2O_4$ wherein a portion of Li is substituted with alkaline earth metal ions; and lithium-nickel-cobalt-manganese composite oxides represented by Formula $Li_{1+z}Ni_bMn_cCO_{1-(b+c+d)}M_dO_{(2-e)}N_e$ ($-0.05 \leq z \leq 0.05$, $0.4 \leq b \leq 0.9$, $0.1 \leq c \leq 0.5$, $0 \leq d \leq 0.1$, $0 \leq e \leq 0.05$ and $b+c+d \leq 1$; M=Al, Mg, Cr, Ti, Si or Y; and N=F, P or Cl), such as $Li_{1+z}Ni_{1/3}CO_{1/3}Mn_{1/3}O_2$ and $Li_{1+z}Ni_{0.4}Mn_{0.4}CO_{0.2}O_2$; and $LiFe_3O_4$.

The lithium transition metal oxide preferably simultaneously contains two or more transition metals selected from the group consisting of Ni, Mn and Co and more preferably all of them.

The sintering conditions for the preparation of the lithium transition metal oxide are known in the art, and detailed description thereof will be omitted herein.

Further, the present invention provides a cathode active material for a lithium secondary battery, comprising the aforesaid lithium transition metal oxide.

In the context of the present invention, the cathode active material may optionally further contain other materials known in the art, in addition to the aforesaid lithium transition metal oxide.

Further, the present invention provides a lithium secondary battery comprising the aforesaid cathode active material.

The lithium secondary battery is generally composed of a cathode, an anode, a separator, and a lithium salt-containing non-aqueous electrolyte.

The cathode is, for example, fabricated by applying a mixture of a cathode active material, a conductive material and a binder to a cathode current collector, followed by drying. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 20% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding of the electrode active material with the conductive material, and in binding of the electrode active material with the current collector. The binder is typically added in an amount of 1 to 20% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying an anode material to an anode current collector, followed by drying. If necessary, other components as described above may be further included.

Examples of the anode materials utilizable in the present invention may include carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or a glass fiber or polyethylene, which have chemical resistance and hydrophobicity, are used. When a solid electrolyte such as a polymer is employed as the electrolyte, the solid electrolyte may also serve as both the separator and electrolyte.

The lithium-containing non-aqueous electrolyte is composed of a non-aqueous electrolyte and lithium. As the non-aqueous electrolyte, a non-aqueous electrolyte solution, an organic solid electrolyte or an inorganic solid electrolyte may be utilized.

Examples of the non-aqueous electrolyte solution that can be used in the present invention may include aprotic organic solvents such as N-methyl-2-pyrollidinone, propylene carbonate, ethylene carbonate, butylene carbonate, dimethyl carbonate, diethyl carbonate, gamma-butyro lactone, 1,2- dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate and the like.

Examples of the organic solid electrolyte utilized in the present invention may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte utilized in the present invention may include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

Nickel sulfate, cobalt sulfate and manganese sulfate were mixed in a molar ratio of 0.55:0.2:0.25 to prepare a 1.5M transition metal aqueous solution. In addition, a 3M sodium hydroxide aqueous solution was also prepared. The transition metal aqueous solution was added to a wet reactor maintained at 45 to 50° C. and containing distilled water. Then, the sodium hydroxide aqueous solution was added such that the distilled water in the wet reactor was maintained at a pH of 11.0 to 11.5. A 30% ammonia solution as an additive was continuously added to the wet reactor at a rate of 0.035 to 0.04 L/hr.

Flow rates of the transition metal aqueous solution, the sodium hydroxide aqueous solution and the ammonia solution were adjusted such that an average residence time of the solutions in the wet reactor was about 5 hours. After the reaction in the reactor arrived at a steady state, a certain duration of time was given to synthesize a composite transition metal precursor with a higher density.

After the arrival of a steady state, the nickel-cobalt-manganese composite transition metal precursor, which was prepared by 20-hour continuous reaction of the reaction materials, was washed several times with distilled water and dried in a 120° C. constant-temperature drying oven for 24 hours to obtain a nickel-cobalt-manganese composite transition metal precursor.

Example 2

A transition metal precursor was prepared in the same manner as in Example 1, except that an ammonia solution was added at a rate of 0.03 to 0.035 L/hr to the wet reactor.

Example 3

A transition metal precursor was prepared in the same manner as in Example 1, except that nickel sulfate, cobalt sulfate and manganese sulfate were mixed in a molar ratio of 0.6:0.2:0.2 to prepare a transition metal aqueous solution.

Example 4

A transition metal precursor was prepared in the same manner as in Example 2, except that nickel sulfate, cobalt sulfate and manganese sulfate were mixed in a molar ratio of 0.6:0.2:0.2 to prepare a transition metal aqueous solution.

Example 5

A transition metal precursor was prepared in the same manner as in Example 1, except that nickel sulfate, cobalt sulfate and manganese sulfate were mixed in a molar ratio of 0.65:0.15:0.2 to prepare a transition metal aqueous solution.

Example 6

A transition metal precursor was prepared in the same manner as in Example 2, except that nickel sulfate, cobalt sulfate and manganese sulfate were mixed in a molar ratio of 0.65:0.15:0.2 to prepare a transition metal aqueous solution.

Example 7

A transition metal precursor was prepared in the same manner as in Example 1, except that nickel sulfate, cobalt sulfate and manganese sulfate were mixed in a molar ratio of 0.8:0.1:0.1 to prepare a transition metal aqueous solution.

Example 8

A transition metal precursor was prepared in the same manner as in Example 2, except that nickel sulfate, cobalt sulfate and manganese sulfate were mixed in a molar ratio of 0.8:0.1:0.1 to prepare a transition metal aqueous solution.

Example 9

A transition metal precursor was prepared in the same manner as in Example 1, except that nickel sulfate and cobalt sulfate were mixed in a molar ratio of 0.6:0.4 to prepare a transition metal aqueous solution.

Example 10

A transition metal precursor was prepared in the same manner as in Example 2, except that nickel sulfate and cobalt sulfate were mixed in a molar ratio of 0.6:0.4 to prepare a transition metal aqueous solution.

Example 11

A transition metal precursor was prepared in the same manner as in Example 1, except that nickel sulfate and cobalt sulfate were mixed in a molar ratio of 0.4:0.6 to prepare a transition metal aqueous solution.

Example 12

A transition metal precursor was prepared in the same manner as in Example 2, except that nickel sulfate and cobalt sulfate were mixed in a molar ratio of 0.4:0.6 to prepare a transition metal aqueous solution.

Comparative Example 1

Nickel sulfate, cobalt sulfate and manganese sulfate were mixed in a molar ratio of 0.55:0.2:0.25 to prepare a 1.5M transition metal aqueous solution. In addition, a 3M sodium hydroxide aqueous solution was also prepared. The transition metal aqueous solution was added to a wet reactor maintained at 45 to 50° C. and containing distilled water. Then, the sodium hydroxide aqueous solution was added such that the distilled water in the wet reactor was maintained at a pH of 10.0 to 10.5. A 30% ammonia solution as an additive was continuously added to the reactor.

The nickel-cobalt-manganese composite transition metal precursor, which was synthesized by 20-hour continuous reaction of the transition metal aqueous solution, the sodium hydroxide aqueous solution and the ammonia solution, was washed several times with distilled water and dried in a constant-temperature drying oven to obtain a nickel-cobalt-manganese composite transition metal precursor.

Comparative Example 2

A transition metal precursor was prepared in the same manner as in Comparative Example 1, except that nickel sulfate, cobalt sulfate and manganese sulfate were mixed in a molar ratio of 0.6:0.2:0.2 to prepare a transition metal aqueous solution.

Comparative Example 3

A transition metal precursor was prepared in the same manner as in Comparative Example 1, except that nickel sulfate, cobalt sulfate and manganese sulfate were mixed in a molar ratio of 0.65:0.15:0.2 to prepare a transition metal aqueous solution.

Comparative Example 4

A transition metal precursor was prepared in the same manner as in Comparative Example 1, except that nickel sulfate, cobalt sulfate and manganese sulfate were mixed in a molar ratio of 0.8:0.1:0.1 to prepare a transition metal aqueous solution.

Comparative Example 5

A transition metal precursor was prepared in the same manner as in Comparative Example 1, except that nickel sulfate and cobalt sulfate were mixed in a molar ratio of 0.6:0.4 to prepare a transition metal aqueous solution.

Comparative Example 6

A transition metal precursor was prepared in the same manner as in Comparative Example 1, except that nickel sulfate and cobalt sulfate were mixed in a molar ratio of 0.4:0.6 to prepare a transition metal aqueous solution.

Experimental Example 1

0.01 g of each of the transition metal precursors prepared in Examples 1 to 12 and Comparative Examples 1 to 6 was accurately weighed and added to a 50 mL Corning tube, to which a small amount of acid was then added dropwise, followed by mixing with shaking. When the mixed sample was clearly dissolved, a concentration of $SO_4$ in the sample was measured using a Dionex DX500 Ion Chromatograph. The results obtained are given in Table 1 below.

TABLE 1

| Samples | Sulfate ion content (wt %) |
|---|---|
| Ex. 1 [$Ni_{0.55}Co_{0.2}Mn_{0.25}$] | 0.22 |
| Ex. 2 [$Ni_{0.55}Co_{0.2}Mn_{0.25}$] | 0.35 |
| Comp. Ex. 1 [$Ni_{0.55}Co_{0.2}Mn_{0.25}$] | 0.94 |
| Ex. 3 [$Ni_{0.6}Co_{0.2}Mn_{0.2}$] | 0.27 |
| Ex. 4 [$Ni_{0.6}Co_{0.2}Mn_{0.2}$] | 0.42 |
| Comp. Ex. 2 [$Ni_{0.6}Co_{0.2}Mn_{0.2}$] | 1.02 |
| Ex. 5 [$Ni_{0.65}Co_{0.15}Mn_{0.2}$] | 0.24 |
| Ex. 6 [$Ni_{0.65}Co_{0.15}Mn_{0.2}$] | 0.34 |
| Comp. Ex. 3 [$Ni_{0.65}Co_{0.15}Mn_{0.2}$] | 0.97 |
| Ex. 7 [$Ni_{0.8}Co_{0.1}Mn_{0.1}$] | 0.21 |
| Ex. 8 [$Ni_{0.8}Co_{0.1}Mn_{0.1}$] | 0.32 |
| Comp. Ex. 4 [$Ni_{0.8}Co_{0.1}Mn_{0.1}$] | 0.85 |
| Ex. 9 [$Ni_{0.6}Co_{0.4}$] | 0.28 |
| Ex. 10 [$Ni_{0.6}Co_{0.4}$] | 0.43 |
| Comp. Ex. 5 [$Ni_{0.6}Co_{0.4}$] | 1.21 |
| Ex. 11 [$Ni_{0.4}Co_{0.6}$] | 0.26 |
| Ex. 12 [$Ni_{0.4}Co_{0.6}$] | 0.46 |
| Comp. Ex. 6 [$Ni_{0.4}Co_{0.6}$] | 1.14 |

As can be seen from the results of Table 1, the transition metal precursors (Examples 1 to 12) in accordance with the present invention contained sulfate ions at a content of about 0.2 to 0.5% by weight, whereas the transition metal precursors of Comparative Examples 1 to 6 contained sulfate ions at a content of about 0.9% by weight or higher.

Experimental Example 2

Each of the transition metal precursors prepared in Examples 1 to 12 and Comparative Examples 1 to 6 was mixed with $Li_2CO_3$ in a ratio of 1:1 (w/w). Each mixture was heated at an elevation rate of 5° C./min and sintered at 920° C. for 10 hours to prepare a lithium transition metal oxide powder (cathode active material). The thus-prepared cathode active material powder, a conductive material (Denka black) and a binder (KF1100) were mixed in a weight ratio of 95:2.5:2.5 to prepare a slurry. The slurry was uniformly coated on aluminum (Al) foil having a thickness of 20 μm. The slurry-coated Al foil was dried at 130° C. to prepare a cathode for a lithium secondary battery. A 2016 coin cell was fabricated using the thus-prepared lithium secondary battery cathode, lithium metal foil as a counter electrode (anode), a polyethylene film (Celgard, thickness: 20 μm) as a separator, and a 1M $LiPF_6$ solution in a 1:2:1 mixture of ethylene carbonate, dimethylene carbonate and diethyl carbonate as a liquid electrolyte.

Electrical properties of the cathode active material in these coin cells were evaluated using an electrochemical analysis system (Toyo System, Toscat 3100U) in the voltage range of 3.0 to 4.25 V. The results obtained are given in Table 2 below. For brevity's sake, test samples are expressed as Chemical Formulae of the corresponding precursors in Table 2 below.

TABLE 2

| Samples | Charge (mAh/g) | Discharge (mAh/g) | Efficiency (%) |
|---|---|---|---|
| Ex. 1 [$Ni_{0.55}Co_{0.2}Mn_{0.25}$] | 188.0 | 167.1 | 88.9 |
| Ex. 2 [$Ni_{0.55}Co_{0.2}Mn_{0.25}$] | 186.5 | 163.4 | 87.6 |
| Comp. Ex. 1 [$Ni_{0.55}Co_{0.2}Mn_{0.25}$] | 183.1 | 153.1 | 83.6 |
| Ex. 3 [$Ni_{0.6}Co_{0.2}Mn_{0.2}$] | 193.4 | 169.8 | 87.8 |
| Ex. 4 [$Ni_{0.6}Co_{0.2}Mn_{0.2}$] | 191.8 | 165.3 | 86.2 |
| Comp. Ex. 2 [$Ni_{0.6}Co_{0.2}Mn_{0.2}$] | 187.4 | 153.5 | 81.9 |
| Ex. 5 [$Ni_{0.65}Co_{0.15}Mn_{0.2}$] | 190.7 | 169.9 | 89.1 |
| Ex. 6 [$Ni_{0.65}Co_{0.15}Mn_{0.2}$] | 188.9 | 165.7 | 87.7 |
| Comp. Ex. 3 [$Ni_{0.65}Co_{0.15}Mn_{0.2}$] | 185.8 | 155.0 | 83.4 |
| Ex. 7 [$Ni_{0.8}Co_{0.1}Mn_{0.1}$] | 209.3 | 188.0 | 89.8 |
| Ex. 8 [$Ni_{0.8}Co_{0.1}Mn_{0.1}$] | 206.6 | 182.6 | 88.4 |
| Comp. Ex. 4 [$Ni_{0.8}Co_{0.1}Mn_{0.1}$] | 203.1 | 172.2 | 84.8 |
| Ex. 9 [$Ni_{0.6}Co_{0.4}$] | 180.7 | 165.0 | 91.3 |
| Ex. 10 [$Ni_{0.6}Co_{0.4}$] | 179.0 | 160.7 | 89.8 |
| Comp. Ex. 5 [$Ni_{0.6}Co_{0.4}$] | 167.5 | 149.1 | 85.4 |
| Ex. 11 [$Ni_{0.4}Co_{0.6}$] | 167.5 | 152.8 | 91.2 |
| Ex. 12 [$Ni_{0.4}Co_{0.6}$] | 165.7 | 148.6 | 89.7 |
| Comp. Ex. 6 [$Ni_{0.4}Co_{0.6}$] | 162.1 | 139.1 | 85.8 |

As can be seen from the results of Table 2, under the same transition metal composition, the lithium secondary batteries, which contain, as a cathode active material, the lithium transition metal oxides prepared from the transition metal precursors (Examples 1 to 12) in accordance with the present invention, exhibited superior performance in the initial charge/discharge and efficiency, as compared to the lithium secondary batteries based on the transition metal precursors of Comparative Examples 1 to 6.

Experimental Example 3

Each of the transition metal precursors prepared in Examples 1 to 12 and Comparative Examples 1 to 6 was mixed with $Li_2CO_3$ in a ratio of 1:1 (w/w). Each mixture was heated at an elevation rate of 5° C./min and sintered at 920° C. for 10 hours to prepare a lithium transition metal oxide powder. Li by-product values were measured by pH titrations of the lithium transition metal oxide powder.

Specifically, 10 g of each lithium transition metal oxide powder was mixed with 100 mL of distilled water for 5 min, and the lithium transition metal oxide was removed by filtering. The resulting solution was titrated with a 0.1N HCl solution to measure values of lithium by-products. Titration was conducted to a pH of 5. The results obtained are given in Table 3 below. For brevity's sake, test samples are expressed as Chemical Formulae of the corresponding precursors in Table 3 below.

TABLE 3

| Samples | Initial pH | 0.1N HCl (mL) | Li by-products (wt %) |
|---|---|---|---|
| Ex. 1 [$Ni_{0.55}Co_{0.2}Mn_{0.25}$] | 10.9 | 4.8 | 0.115 |
| Ex. 2 [$Ni_{0.55}Co_{0.2}Mn_{0.25}$] | 11.1 | 5.8 | 0.138 |
| Comp. Ex. 1 [$Ni_{0.55}Co_{0.2}Mn_{0.25}$] | 11.6 | 10.9 | 0.261 |
| Ex. 3 [$Ni_{0.6}Co_{0.2}Mn_{0.2}$] | 11.0 | 5.3 | 0.127 |
| Ex. 4 [$Ni_{0.6}Co_{0.2}Mn_{0.2}$] | 11.2 | 6.1 | 0.146 |
| Comp. Ex. 2 [$Ni_{0.6}Co_{0.2}Mn_{0.2}$] | 11.9 | 12.2 | 0.292 |
| Ex. 5 [$Ni_{0.65}Co_{0.15}Mn_{0.2}$] | 11.2 | 6.1 | 0.148 |
| Ex. 6 [$Ni_{0.65}Co_{0.15}Mn_{0.2}$] | 11.4 | 6.9 | 0.165 |
| Comp. Ex. 3 [$Ni_{0.65}Co_{0.15}Mn_{0.2}$] | 11.9 | 12.4 | 0.297 |
| Ex. 7 [$Ni_{0.8}Co_{0.1}Mn_{0.1}$] | 11.5 | 10.7 | 0.256 |
| Ex. 8 [$Ni_{0.8}Co_{0.1}Mn_{0.1}$] | 11.7 | 11.4 | 0.273 |
| Comp. Ex. 4 [$Ni_{0.8}Co_{0.1}Mn_{0.1}$] | 12.2 | 23.3 | 0.558 |
| Ex. 9 [$Ni_{0.6}Co_{0.4}$] | 10.8 | 6.9 | 0.165 |
| Ex. 10 [$Ni_{0.6}Co_{0.4}$] | 11.0 | 7.6 | 0.182 |
| Comp. Ex. 5 [$Ni_{0.6}Co_{0.4}$] | 11.7 | 13.6 | 0.326 |
| Ex. 11 [$Ni_{0.4}Co_{0.6}$] | 11.2 | 7.5 | 0.180 |
| Ex. 12 [$Ni_{0.4}Co_{0.6}$] | 11.4 | 8.7 | 0.208 |
| Comp. Ex. 6 [$Ni_{0.4}Co_{0.6}$] | 11.8 | 14.8 | 0.355 |

As can be seen from the results of Table 3, under the same transition metal composition, the lithium transition metal oxides prepared from the transition metal precursors (Examples 1 to 12) in accordance with the present invention exhibited a significant reduction of Li by-products, as compared to the lithium transition metal oxides prepared from the transition metal precursors of Comparative Examples 1 to 6. Upon considering the fact that the Li by-products cause undesirable changes such as gelation of slurry, deterioration in high-temperature performance of the battery, swelling at high temperatures, and the like, it is expected that the lithium secondary battery in accordance with the present invention can exhibit significantly superior battery performance to that of the conventional lithium secondary battery.

INDUSTRIAL APPLICABILITY

As apparent from the above description, a precursor in accordance with the present invention contains a certain amount of sulfate ion-containing salt ions derived from a transition metal salt which serves as a raw material of the precursor. The incorporation of the sulfate ion-containing salt ions into the precursor can provide a lithium secondary battery which is capable of achieving excellent performance (such as high capacity, long life characteristics and high-rate characteristics) and minimized degradation of electrodes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A precursor for the preparation of a lithium transition metal oxide that is used for the preparation of a lithium transition metal oxide as a cathode active material for a lithium secondary battery, through a reaction with a lithium-containing compound, wherein the precursor contains two or more transition metals, and the precursor also contains sulfate ion ($SO_4$)-containing salt ions derived from a transition metal salt for the preparation of the precursor at a content of 0.1 to 0.7% by weight based on the total weight of the precursor.

2. The precursor according to claim 1, wherein the transition metal is two or more elements selected from Group VB to VIIIB elements of the Periodic Table of the Elements.

3. The precursor according to claim 1, wherein the transition metal is two or more elements selected from the group consisting of Ni, Mn and Co.

4. The precursor according to claim 1, wherein the transition metal has a composition of $Ni_xCo_yMn_{1-(x+y)}$ wherein $0.3 \leq x \leq 0.9$, $0.1 \leq y \leq 0.6$, and $x+y<1$.

5. The precursor according to claim 4, wherein the transition metal is substituted with one or more elements selected from the group consisting of Al, Mg, Cr, Ti and Si within the range of 0.1 mole or less.

6. The precursor according to claim 1, wherein the transition metal salt is sulfate.

7. The precursor according to claim 6, wherein the sulfate is one or more selected from the group consisting of nickel sulfate, cobalt sulfate and manganese sulfate.

8. The precursor according to claim 1, wherein the salt ions include nitrate ions ($NO_3$).

9. The precursor according to claim 1, wherein the salt ions have a content of 0.2 to 0.6% by weight, based on the total weight of the precursor.

10. The precursor according to claim 1, wherein the precursor comprising sulfate ion ($SO_4$)-containing salt ions is prepared by a sol-gel, hydrothermal, spray pyrolysis or co-precipitation method.

* * * * *